3,171,819
PREPARATION OF POLYURETHANE FOAMS CONTAINING A TRIS HALOALKYL PHOSPHATE AND ADDUCT THEREFOR
Thomas M. Powanda, Middlesex, N.J., assignor to Celanese Corporation of America, New York, N.Y., a corporation of Delaware
No Drawing. Filed Jan. 18, 1961, Ser. No. 83,379
17 Claims. (Cl. 260—2.5)

This invention relates to the preparation of polyurethane foams and more particularly, to the production of stable adducts useful therein.

One of the necessary components used in the preparation of polyurethane foams is a compound containing free isocyanate (—NCO) radicals. This component can be a polyisocyanate, usually a diisocyanate, or a reaction product thereof containing free —NCO radicals. Such a reaction product is sometimes called an adduct or a prepolymer and is usually formed with a polyol or a hydroxyl-terminated polyester or polyether. The second necessary component supplies reactive hydroxyl groups, derived from either a polyol or a hydroxyl-terminated polyester or polyether. In most cases small quantities of water are added to the reaction mixture in order to react with some of the free —NCO groups, forming $CO_2$ in situ during the reaction. In many formulations, catalysts are also present. Optionally auxiliary foamers such as trichlorofluoromethane may be added.

Many problems are encountered in the preparation of successful and practical formulations. The handling of diisocyanates involves certain hazards and inconveniences. For this reason, it becomes preferable to work with adducts or prepolymers which supply reactive —NCO groups. Such adducts or prepolymers should be stable and should be in liquid form at a viscosity low enough for easy blending. Lack of stability may require the preparation of the adduct or prepolymer just prior to the production of the polyurethane foam.

In one useful method of producing polyurethane foams, a liquid hydroxyl-terminated polyester, such as a trimethylolpropane-adipic acid reaction product, is reacted with a large excess of tolylene diisocyanate to produce an isocyanate-containing prepolymer which is reacted with additional hydroxyl-terminated polyester to produce the desired foam.

Accordingly one of the objects of this invention is to produce a useful adduct in liquid form having high stability characteristics by reacting an aromatic diioscyanate, such as tolylene diisocyanate, with trimethylolpropane.

A further object of this invention is the preparation of flame-resistant polyurethane foams. Still further objects will be apparent from the description which follows.

According to this invention, a stable adduct or prepolymer is formed from an arylene diisocyanate, such as tolylene diisocyanate, with certain triols, such as trimethylolpropane, in the presence of a tris-haloalkyl phosphate. The tris-haloalkyl phosphate is a liquid and acts as a substantially nonvolatile diluent. In producing the polyurethane foams, the stable adduct, is reacted with a hydroxyl supplying agent, which is a trifunctional polyol preferably containing ether linkages. Examples of the trifunctional polyols are trimethylolpropane, trimethylolpropane-polypropylene oxide condensation products and mixtures thereof. In another embodiment of this invention the hydroxyl supplying agents can be bifunctional polyols (diols) and can contain hydroxyl-terminated polyesters otherwise known in the polyurethane foam ;

In the description following hereinafter the "adduc referred to are made from the following materials: ( arylene diisocyanates, (2) triols and (3) tris-haloal. phosphates.

The preferred arylene diisocyanate is a tolylene isocyanate. Two isomers of the tolylene diisocyana are commercially available 2,4 tolylene diisocyanate a 2,6 tolylene diisocyanate. Commercially mixtures of two isomers are available in mixture ranges of about 8C 2,4 tolylene diisocyanate and 20% 2,6 tolylene diisoc; nate. Other commercial mixtures contain 60% to 65 2,4 tolylene diisocyanate and 35% to 40% 2,6 tolyle diisocyanate. In the illustrative examples the 80/ mixture grade is used.

The adduct forming triols of this invention are ; methylol triols, where all 3 methylol groups are connec to one carbon atom. They include: trimethylol-propa trimethylolethane and trimethylolbutane. Trimethyl propane is preferred.

The tris-haloalkyl phosphates used in the adduct f mation are illustrated by tris beta-chloroethyl phosphɛ tris beta-chloropropyl phosphate, tris dichloropro; phosphate, tris dibromopropyl phosphate and tris chlo bromo-propyl phosphate. Of these, tris beta-chloroet] phosphate is preferred.

Tris-haloalkyl phosphates have been previously u: in polyurethane foam formulations to contribute flameproof qualities. In such formulations the ph phates act as plasticizers. In their novel use herein c( templated, they are used as stabilizing diluents duri adduct formation, resulting in excellent stability of 1 liquid adduct for periods as long as a year without ١ cosity changes and also in a higher degree of ability crosslink in the final foam preparation.

The reaction products of tolylene diisocyanate and 1 methylolpropane are hard and unusable masses. Addu with larger excesses of tolylene diisocyanate are m( fluid in general but they are not stable and solidify sho ly after preparation. If instead of trimethylolpropa alone, mixtures of trimethylolpropane and diol poly were used, with large proportions of diols present in 1 mixture, liquid products result; however, the functional of the polyol mixture is greatly reduced and the fii polymer foams are inferior in quality. Volatile solve) also yield liquid products but presence of solvents cat numerous drawbacks, one of them being heat distorti and low dimensional stability at elevated temperatures.

In accordance with the present invention, it has be found that the use of a tris beta-chloroalkyl phosphate the adduct formation has provided a diluent for the adduct systems rendering them stable over long peric of time.

In the following specific examples the effect of 1 tris beta-chloroalkyl phosphate on adduct formation effectively illustrated.

EXAMPLES I, II AND III

Three adducts were prepared by adding 3 mols of tol ene diisocyanate to a 1 liter four neck reaction fla: which was maintained under a nitrogen atmosphe Heat was applied until the temperature of the tolylene ι isocyanate reached 65° C. At this point 1 mol of t methylolpropane or the blend of trimethylolpropane-tr oroethyl phosphate containing 1 mol trimethylol-
, preheated to 65° C. was slowly added to flask.
othermic reaction in the flask was controlled by
 cooling and the temperature of the reaction mix-
s kept at 70° C. until the exothermic reaction was
e, evidenced by a temperature decline. The sec-
tion of the tolylene diisocyanate was then added
the quantity of which was varied depending on
red percent excess of tolylene diisocyanate re-
The reaction product was then cooled to room
ture and transferred to a jar under nitrogen at-
e.
1 shows the formulations of Examples I to III
properties of the adducts formed.

*Table 1*

|  | Example I | Example II | Example III |
|---|---|---|---|
| lolpropane | 134 | 134 | 134. |
| liisocyanate | 522 | 522 | 522. |
| -chloroethyl phos- | 308 | | |
| (TDI) diisocyanate | 261 | 261 | 391. |
| xcess TDI | 50 | 50 | 75. |
| ris-beta-chloroethyl ite. | 25.1 | | |
| OH ratio | 3/1 | 3/1 | 10.5/3. |
| scosity at 25° C. | 3,400 | 148,000 | 10,600. |
| ce as made (fresh) | Clear | Clear | Clear. |
| ce after 14 days | Clear | Flocculent | Flocculent. |
| ce after 170 days | Clear | White solid | White solid. |
| after 170 days at 25° | 3,600 | | | n be seen from Table 1, Examples II and III did
d satisfactory products despite the fact that the
of Example III was made with excess tolylene di-
te. The product of Example I is a stable liquid
and illustrates the product of this invention.
xcess isocyanate percentage in the adducts of this
n may range from about 25% to about 100%.
num of 50% is preferred. There is rarely any
ge in using excess over 75%. The tris-haloalkyl
te content of the adduct may range from about
about 40%. The preferred range is from about
about 30%.
nitial tolylene diisocyanate and the trimethylol-
in the trimethylolpropane-tris-beta-chloroethyl
te blend are in approximately stoichiometric
s and the free isocyanato groups of the adduct
rom the excess tolylene diisocyanate, which is
fter completion of the exothermic reaction. It
found that other possible changes of order of
result in less favorable products, e.g., if all the
diisocyanate is present in the reactor first, or
lylene diisocyanate is added to the trimethylol-
tris-beta-chloroethyl-phosphate blend, the result-
ct has less desirable properties than the product
ple I.
dducts of this invention are useful in polyure-
am compositions as —NCO-supplying agents.
supplying agents, polyols (diols or triols) or hy-
rminated polyesters, known in the art, can be
he adducts can be used in formulating rigid or
d or flexible polyurethane foams. Catalysts may be present in the composition, such as dimethylaniline,
quinoline, pyridine, triamyline, triethylamine, tripropyl-
amine, N-methyl-morpholine, N-ethylmorpholine, di-
ethylethanolamine, triethylenediamine, dimethylethanol-
amine. Silicone emulsifying agents are advantageously
also present to control the uniformity of cell structure,
as is known to those skilled in the art.

The adducts of this invention are illustrated below in
rigid foam formulations where flame retardant proper-
ties of the foams formed are also shown. A comparison
is also made with similar foam systems in which the ad-
duct used does not contain tris beta-chloroethyl phos-
phate, but the tris beta-chloroethyl phosphate is added to
the foaming compound formulation just prior to use.

In the following example, a prepolymer is made with
"Pluracol TP-440" which is a propylene oxide condensa-
tion product with trimethylolpropane having a general
formula:

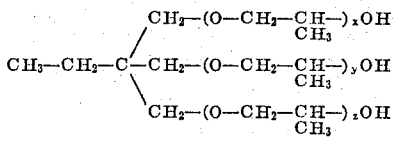

The values for $x$, $y$ and $z$ are approximately equal. The
molecular weight is about 400, the hydroxyl number is
about 400, the equivalent weight is 137, percent hydroxyl
about 12.4, number of atoms for each branch is 8.

Example IV shows a prepolymer formulation with
TP-440.

EXAMPLE IV

Reactants:　　　　　　　　　　Grams
(A) Pluracol TP-440_____ 658.2⎫
(B) Tolylene diisocyanate____ 2,679.6⎬—NCO/—OH 7.0/1.0⎫—NCO/—OH 3.5/1.0
(C) Pluracol TP-440_____ 658.2　　　　　　　　　　　　⎭

The prepolymer was made in accordance with the fol-
lowing procedure:
(1) Tolylene diisocyanate (B) was charged to the re-
actor and TP-440 (A) was added slowly. The reaction
was exothermic and the temperature rose to about 60° C.
(2) After all of (A) was added, the temperature was
held for one hour at 60° C.
(3) The second portion of TP-440 (C) was added
slowly. The reaction was exothermic and the reaction
mixture was kept at 90° C. while using external cooling.
(4) The temperature was held at 90° C. for one hour,
after all of (C) was added.
(5) The mixture was cooled to room temperature and
discharged.

Constants of prepolymer:
　　Viscosity at 25° C. _____cps__ 20,200
　　Percent free isocyanate _____percent__ 22.1

With the adduct of Example I and with the prepolymer
of Example IV, rigid polyurethane foam compositions
were prepared. The foams with the adduct of Example I
were formulated at tris beta-chloroethyl phosphate con-
tents of 15% and 20%, respectively. The foams with the
prepolymer of Example IV were formulated at the same
phosphate content, the same free isocyanate content and
at a free isocyanate-water ratio of 1/1. In one case no
tris beta-chloroethyl phosphate was added in order to
obtain a control free of this compound. The formula-
tions were cured for two weeks at room temperature.

Flammability was determined in accordance with the
procedure outlined in A.S.T.M. Designation D635–56T.
The procedure was modified in that the specimen size was
5 in. x .05 in. and the specimen was held with its trans-
verse axis in a horizontal position rather than at a 45
degree angle as described in the test procedure.

Table 2 describes the formulations of the ingredients of foam and Table 3 describes the test results obtained.

Table 2

|  | Foam A | Foam B | Foam C | Foam D | Foam E |
|---|---|---|---|---|---|
| Adduct of Ex. I | None | 119.8 | None | 159.2 | None |
| Adduct of Ex. IV | 166.5 | 46.0 | 141.5 | 6.3 | 133.0 |
| 50/50 wt. ratio of TP-440 and trimethylolpropane | 33.5 | 34.2 | 28.4 | 34.5 | 26.7 |
| Tris beta-chloroethyl phosphate | None | None | 30.0 | None | 40.0 |
| Water | 3.4 | 3.1 | 2.9 | 2.9 | 2.7 |
| Silicone emulsifying agent | 0.8 | 0.8 | 0.7 | 0.8 | 0.6 |
| Dimethylethanolamine | 2.0 | 2.0 | 1.7 | 2.0 | 1.6 |
| Percent Tris beta-chloroethyl phosphate | None | 15.0 | 15.0 | 20.0 | 20.0 |
| Mixing time (secs.) | 10 | 10 | 11 | 10 | 10 |
| Rise time (mins.) | 1.5 | 1.5 | 3.0 | 1.5 | 3.0 |
| Set time (mins.) | 3.5 | 3.5 | 8.0 | 3.5 | 8.0 |

Table 3

| Foam No. | Percent Tris Beta-Chloroethyl | Average amount Consumed (ins.) | Average Burning Time (seconds) | Average Burning Rate (in./min.) | Number of samples tested |
|---|---|---|---|---|---|
| A | None | 4 | 16.6 | 14.7 | 10 |
| B | 15 | [1] 0.6 | 10.4 | 3.7 | 7 |
| C | 15 | [1] 1.3 | 17.2 | 4.3 | 10 |
| D | 20 | [2] | [2] | [2] | 10 |
| E | 20 | [1] 2.4 | 37.3 | 4.1 | 7 |

[1] Self-extinguishing.
[2] Non-burning.

A material is considered "non-burning" if the specimen does not ignite on two attempts. It is considered "self-extinguishing" if the specimen does not burn to the 4-inch mark after the first or second ignition.

The data of Tables 2 and 3 show the comparison of the flame retardant properties of the adduct of Example I with an equivalent foaming system where tris beta-chloroethyl phosphate was either not incorporated, or was added just prior to foaming during the blending of the foaming ingredients. The control Foam A showed considerable burning damage with high figures for amount consumed, burning time and burning rate. At 15% level of tris beta-chloroethyl phosphate both Foams B and C were judged self-extinguishing, however, Foam B containing the adduct of Example I showed lower amount of amount consumed, lower burning time and lower burning rate. At 20% level of the phosphate Foam D containing the adduct of Example I was completely non-burning whereas Foam E where the phosphate was incorporated as such, prior to the foaming, reached only the self-extinguishing stage, showed a considerable amount consumed, a long burning time and a comparatively high burning rate. The flame retardant properties of the adduct were of considerable magnitude.

If the adducts of this invention are used for their flame retardant properties, the foaming ingredients should be formulated to contain at least about 10% tris-haloalkyl phosphate in the polyurethane foam. The percentage of the phosphate does not need to be higher than 20% to achieve non-burning qualities. Higher percentages may be used for special purposes or to meet requirements of the formed foam other than flame retardancy.

It is to be understood that the foregoing detailed description is given merely by way of illustration and that many variations may be made therein without departing from the spirit of my invention.

Having described my invention what I desire to secure by Letters Patent is:

1. A liquid, storage-stable adduct with high functionality and having free isocyanato groups useful in the production of polyurethane foams, said adduct being the product of the reaction, in the presence of a tris-haloalkyl phosphate, of an arylene diisocyanate and a trimethylol triol having three methylol groups connected to a single carbon atom.

2. The duct of claim 1 in which the trimethylol triol having three methylol groups connected to a single carbon atom is a trimethylolalkane carrying the three methylol radicals attached to a single carbon atom.

3. The adduct of claim 1 wherein the trimethylol triol having three methylol groups connected to a single carbon atom is trimethylolpropane.

4. The adduct of claim 1 wherein the arylene diisocyanate is tolylene diisocyanate.

5. A liquid, storage-stable adduct with high functionality and having free isocyanato groups useful in the production of polyurethane foams, said adduct being the reaction product of an arylene diisocyanate, a trimethylol triol having three methylol groups connected to a single carbon atom and tris beta-chloroethyl phosphate.

6. The adduct of claim 5 wherein the tris beta-chloroethyl phosphate is present in the adduct in the percentage range of from about 15 percent to 40 percent, by weight based on the total weight of the adduct.

7. The adduct of claim 5 wherein the tris beta-chloroethyl phosphate is present in the adduct in the weight percentage range of from about 25 percent to about 3 percent based on the total weight of the adduct.

8. The adduct of claim 5 containing free isocyanat groupings from about 14% to about 25%, by weigh and being based on the total weight of the adduct.

9. A process for the production of a liquid, stabl adduct with high functionality and useful as an isocyanat supplying component of polyurethane foam composition comprising the steps of reacting about one mol of trimethylol triol having three methylol groups connecte to a single carbon atom with about three mols of an ary ene diisocyanate in the presence of tris-haloalkyl phospha and then reacting additional arylene diisocyanate wit the product of the first reaction step.

10. The process of claim 9 in which the arylene d isocyanate is tolylene diisocyanate.

11. The process of claim 10 in which the trimethyl triol having three methylol groups connected to a sing carbon atom is trimethylolpropane.

12. The process of claim 10 in which the tris-haloalk phosphate is tris beta-chloroethyl phosphate.

13. The process of claim 10 wherein the reaction c the first step is carried out at about 65° C.

14. The process of claim 10 in which the tris haloalk phosphate is used in proportions ranging from about 1 percent to about 40 percent of the total weight of th adduct.

15. The process of claim 10 wherein the arylene d isocyanate is tolylene diisocyanate, the trimethylol tri having three methylol groups connected to a single ca bon atom is trimethylolpropane and the tris-haloalk phosphate is tris beta-chloroethyl phosphate.

16. In the process for the preparation of polyurethar foams by the reaction of an isocyanate, an active hydro containing compound selected from the group consistin of polyesters and polyethers and a blowing agent, th improvement which comprises using as the isocyana supplying agent, a liquid, storage stable adduct which the reaction product of an arylene diisocyanate, a tr methylol triol having three methylol groups connecte to a single carbon atom and a tris-haloalkyl phosphate.

17. The process of claim 16 wherein the arylene d isocyanate is tolylene diisocyanate, the trimethylol tri having three methylol groups connected to a single carbo atom is trimethylolpropane and the tris-haloalkyl pho phate is tris beta-chloroethyl phosphate.

References Cited in the file of this patent
UNITED STATES PATENTS

| 2,956,031 | Khawam | Oct. 11, 196 |
| 2,981,700 | Parker et al. | Apr. 25, 196 |
| 3,076,770 | Saunders et al. | Feb. 5, 196 |

FOREIGN PATENTS

| 205,456 | Australia | Jan. 4, 195 |